(12) United States Patent
Kusunoki et al.

(10) Patent No.: US 10,139,552 B2
(45) Date of Patent: Nov. 27, 2018

(54) PLANAR LIGHTING DEVICE HAVING LIGHT SOURCES WITH ELECTRODE TERMINALS AND MOUNTING SUBSTRATE WITH CONDUCTIVE PATTERN INCLUDING A PLURALITY OF LANDS TOGETHER HAVING RELATIVE SPACING BETWEEN THE LANDS AND ELECTRODE TERMINALS

(71) Applicant: MINEBEA MITSUMI INC., Kitasaku-gun, Nagano (JP)

(72) Inventors: Ippei Kusunoki, Fukuroi (JP); Makoto Furuta, Fukuroi (JP)

(73) Assignee: MINEBEA MITSUMI INC., Nagano (JP)

( * ) Notice: Subject to any disclaimer, the term of this patent is extended or adjusted under 35 U.S.C. 154(b) by 315 days.

(21) Appl. No.: 14/979,777

(22) Filed: Dec. 28, 2015

(65) Prior Publication Data

US 2016/0195671 A1 Jul. 7, 2016

(30) Foreign Application Priority Data

Jan. 7, 2015 (JP) ................................ 2015-001820

(51) Int. Cl.
*F21V 8/00* (2006.01)

(52) U.S. Cl.
CPC ......... *G02B 6/0083* (2013.01); *G02B 6/0068* (2013.01)

(58) Field of Classification Search
CPC ... G02B 6/0083; H01L 33/483–33/486; H01L 33/62
See application file for complete search history.

(56) References Cited

U.S. PATENT DOCUMENTS 6,812,498 B1 * 11/2004 Moon ................... H01L 25/167
257/678
8,303,152 B2 * 11/2012 Kawashima ......... G02B 6/0073
349/65
(Continued)

FOREIGN PATENT DOCUMENTS

CN 104620040 A 5/2015
JP 05-037144 A 2/1993
(Continued)

OTHER PUBLICATIONS

Notification of Reasons for Refusal dated Aug. 15, 2017 for corresponding Japanese Application No. 2015-001820.
(Continued)

*Primary Examiner* — Jong-Suk (James) Lee
*Assistant Examiner* — Christopher E Dunay
(74) *Attorney, Agent, or Firm* — Pearne & Gordon LLP

(57) ABSTRACT

A planar lighting device includes: a light guide plate; a plurality of light sources arranged in line along a longitudinal direction of a side end surface of the light guide plate, each of light sources including a pair of electrode terminals; and a mounting substrate on which the light sources are mounted, the mounting substrate including a conductive pattern including a plurality of pairs of lands to which the respective pairs of electrode terminals of the light sources are connected. The light sources are mounted such that, in a longitudinal direction of the light sources, a gap between an outer side of each of the pairs of electrode terminals and an outer side of corresponding one of the pairs of lands is smaller than a gap between an inner side of the pair of electrode terminals and an inner side of the corresponding pair of lands.

11 Claims, 6 Drawing Sheets

(56) References Cited

U.S. PATENT DOCUMENTS

| | | | | |
|---|---|---|---|---|
| 2010/0271568 A1* | 10/2010 | Jung | ............... | G02F 1/133608 |
| | | | | 349/65 |
| 2013/0188394 A1* | 7/2013 | Horikawa | ............... | F21V 21/00 |
| | | | | 362/613 |
| 2015/0226415 A1 | 8/2015 | Tanaka et al. | | |
| 2015/0340568 A1* | 11/2015 | Hsieh | ............... | H01L 33/483 |
| | | | | 174/250 |
| 2016/0195671 A1* | 7/2016 | Kusunoki | ............ | G02B 6/0083 |
| | | | | 362/613 |

FOREIGN PATENT DOCUMENTS

| | | |
|---|---|---|
| JP | 2005-101187 A | 4/2005 |
| JP | 2007-250765 A | 9/2007 |
| JP | 2013-149511 A | 8/2013 |

OTHER PUBLICATIONS

Chinese Office Action dated Aug. 29, 2018 for corresponding Chinese Application No. 201511021133.8.

* cited by examiner

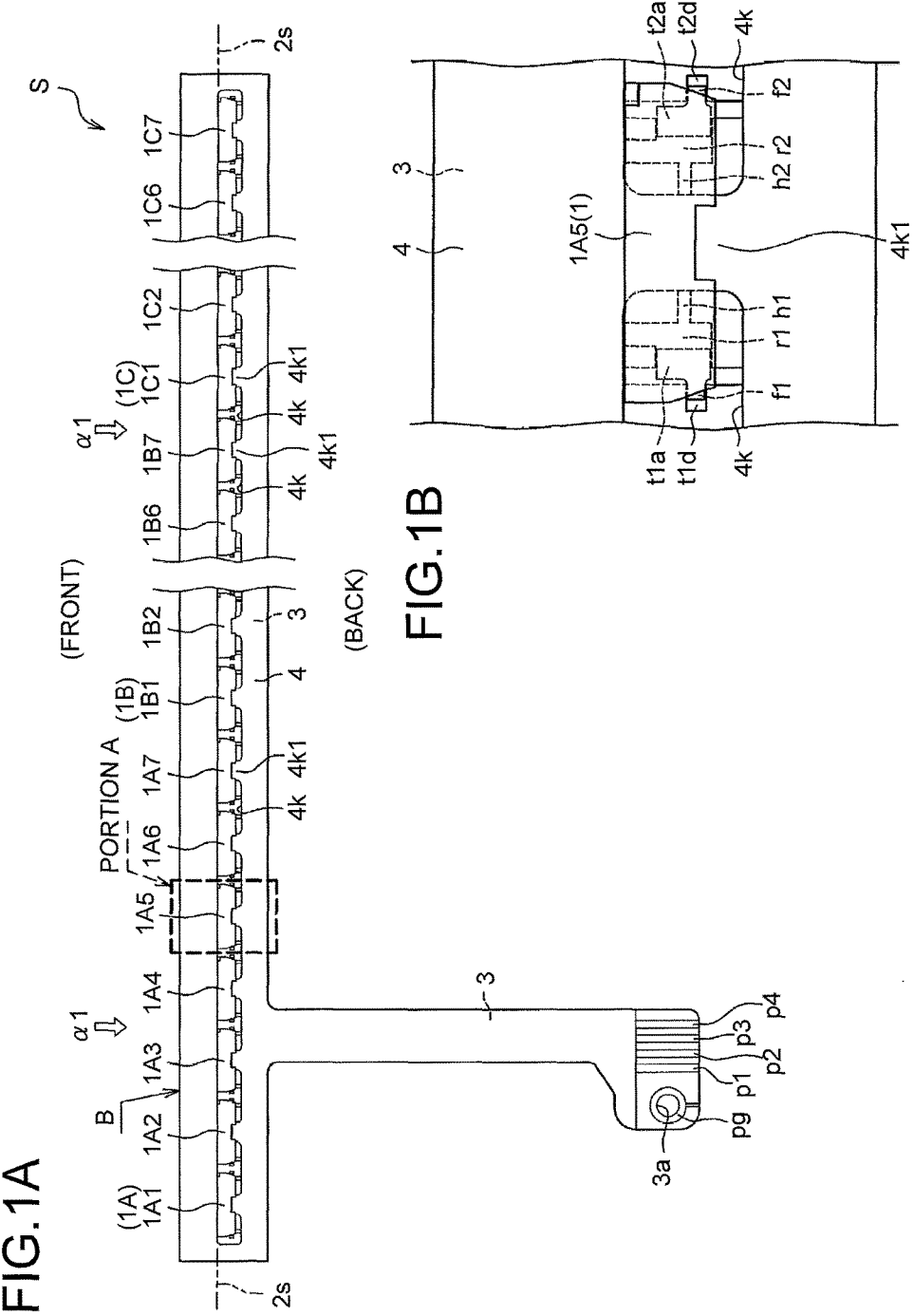

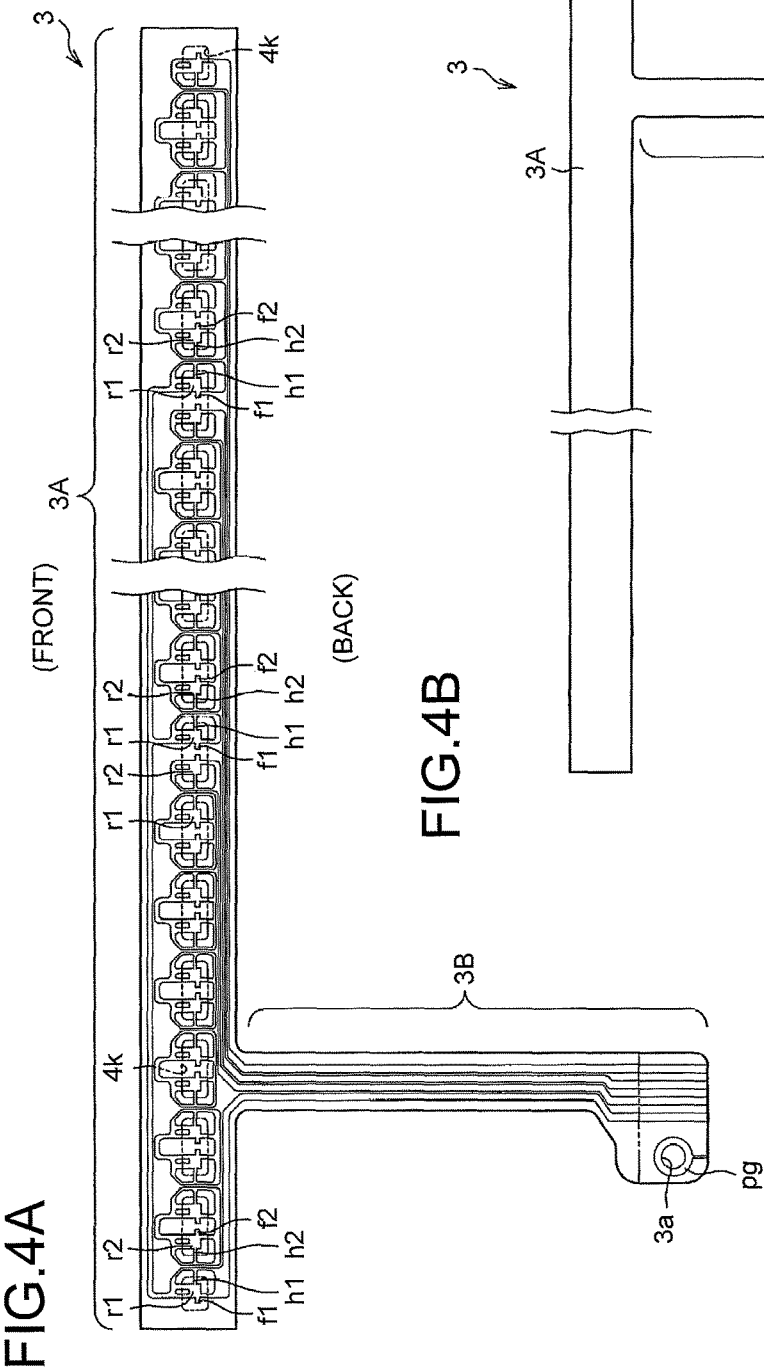

PLANAR LIGHTING DEVICE HAVING LIGHT SOURCES WITH ELECTRODE TERMINALS AND MOUNTING SUBSTRATE WITH CONDUCTIVE PATTERN INCLUDING A PLURALITY OF LANDS TOGETHER HAVING RELATIVE SPACING BETWEEN THE LANDS AND ELECTRODE TERMINALS

CROSS-REFERENCE TO RELATED APPLICATION(S)

The present application claims priority to and incorporates by reference the entire contents of Japanese Patent Application No. 2015-001820 filed in Japan on Jan. 7, 2015.

BACKGROUND OF THE INVENTION

1. Field of the Invention

The disclosure relates to a sidelight planar lighting device.

2. Description of the Related Art

In order to further improve the visibility of display screens, there have recently been an increasing demand for planar lighting devices (backlight) used for liquid-crystal display devices and other devices to have higher luminance. In a conventional pattern shape of connection wiring formed on a circuit substrate on which light-emitting diodes (LEDs) serving as light sources are mounted, however, there is a limit to the distance between mountable LEDs and thus to the number of LEDs.

Japanese Laid-open Patent Publication No. 2013-149511 is disclosed as an invention described in a publication relating to the present disclosure.

In order to further increase the luminance in a planar lighting device, it is necessary to further increase the number of LEDs arranged along a side end surface (light entrance surface) of a light guide plate. In other words, it is necessary to make a pitch between the LEDs narrower.

FIG. 6 is a plan view of an arrangement of lands in a circuit pattern of a light source unit of a conventional planar lighting device and electrode terminals in an LED package connected to the lands. In the conventional sidelight planar lighting device, a plurality of LED packages (not illustrated) are mounted on a substrate 102. The LED packages are arranged in a manner abutting on a side end surface of a flat light guide plate (not illustrated). The LED packages output light to the inside of the flat light guide plate through the side end surface thereof.

The substrate 102 on which the LED packages are mounted is flexible printed circuits (FPC), and the surface thereof is covered with a cover lay 104 made of an insulating material. A pair of electrode terminals t101 and t102 of the respective LED packages is connected to lands 102$r$. The lands 102$r$ and a part of connection wiring (conduction pattern) connected to the lands 102$r$ are exposed from openings 104$k$ of the cover lay 104. In other words, a part of the connection wiring that couples the facing lands 102$r$ of the adjacent LEDs is covered with a part of the cover lay 104.

In the conventional technique, as illustrated in FIG. 6, a gap (clearance) s10 between the respective lands 102$r$ and the electrode terminals t101 and t102 on the inner sides of the two electrode terminals t101 and t102 in the LED is reduced to 0.1 mm. The mounting accuracy of the LED is thus secured.

In the conventional technique, a gap s11 (=0.29 mm) between the outer sides of the electrode terminals t101 and t102 of the LED package and the outer sides of the respective lands 102$r$ of the substrate 102 is set larger than the gap s10 (=0.1 mm) between the inner sides of the electrode terminals t101 and t102 of the LED package and the inner sides of the respective lands 102$r$ of the substrate 102. In other words, in the conventional technique, a pair of lands 102$r$ is formed such that the pair of electrode terminals t101 and t102 of the LED package is arranged at an inner area in the pair of lands 102$r$ of the substrate 102. Protruding portions t101$c$ and t102$c$ of the electrode terminals t101 and t102, respectively, are arranged in the pair of lands 102$r$ (rectangular main lands) of the substrate 102.

To increase the luminance of the LEDs as described above, there are two following requirements. First, it is necessary to mount the LEDs with as high density as possible while considering limiting conditions, such as wiring.

Second, to suppress light leakage when LED light enters into the light guide plate, it is necessary to improve the mounting accuracy of the LEDs. Specifically, to stably provide the lighting properties (high luminance and uniformization in lighting) of the planar lighting device at a high level, it is necessary to fix all the LEDs to predetermined positions with high accuracy. To achieve this, it is necessary to perform self-alignment with high accuracy when the LEDs are mounted on the lands 102$r$ of the substrate 102.

SUMMARY OF THE INVENTION

It is an object of the present disclosure to at least partially solve the problems in the conventional technique.

A planar lighting device includes: a light guide plate; a plurality of light sources arranged in line along a longitudinal direction of a side end surface of the light guide plate, each of light sources including a pair of electrode terminals; and a mounting substrate on which the light sources are mounted, the mounting substrate including a conductive pattern including a plurality of pairs of lands to which the respective pairs of electrode terminals of the light sources are connected. The light sources are mounted such that, in a longitudinal direction of the light sources, a gap between an outer side of each of the pairs of electrode terminals and an outer side of corresponding one of the pairs of lands is smaller than a gap between an inner side of the pair of electrode terminals and an inner side of the corresponding pair of lands.

The above and other objects, features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 1A is a plan view of a planar lighting device according to an embodiment of the present disclosure, and FIG. 1B is an enlarged view of the portion A illustrated in FIG. 1A;

FIG. 4A is a plan view of the front surface of the FPC according to the embodiment, and FIG. 4B is a plan view of the back surface of the FPC according to the embodiment;

DETAILED DESCRIPTION OF THE PREFERRED EMBODIMENTS

Exemplary embodiments according to the disclosure are described below in greater detail with reference to the accompanying drawings. FIG. 1A is a plan view of a planar lighting device according to an embodiment of the disclosure. FIG. 1B is an enlarged view of the portion A illustrated in FIG. 1A. A planar lighting device S according to the embodiment is a plane lighting device used for a backlight of a liquid-crystal panel and other devices and outputs light from the back side (farther side on the paper in FIG. 1A) to the front side (nearer side on the paper in FIG. 1A).

The planar lighting device S is a device called a sidelight backlight in which light-emitting diode (LED) packages 1 serving as light sources are arranged on a side of a light guide plate 2 (indicated by the alternate long and two short dashes line in FIG. 1A).

Specifically, the planar lighting device S includes a plurality of LED packages 1 (1A1 to 1A7, 1B1 to 1B7, and 101 to 1C7) mounted on flexible printed circuits (FPC) 3. The LED packages 1 are arranged in a manner abutting on or aligned along a side end surface 2s on the side of the light guide plate 2. LED chips (not illustrated) housed in the respective LED packages 1 output light to the light guide plate 2.

A reflection sheet (not illustrated) is arranged on the back side (farther side on the paper in FIG. 1A) of the light guide plate 2 and reflects light not satisfying all reflection conditions of the light guide plate 2 and leaking outward to the front side (nearer side on the paper in FIG. 1A). By contrast, a diffusion sheet (not illustrated) that diffuses light, a prism sheet (not illustrated) that increases the luminance, and other components are arranged on the front side (nearer side on the paper in FIG. 1A) of the light guide plate 2. A liquid-crystal panel (not illustrated) that displays video and other components is arranged on the front side of the diffusion sheet and the prism sheet.

The LED packages 1 (1A1 to 1A7, 1B1 to 1B7, and 101 to 1C7) each houses therein a blue LED chip and a yellow fluorescent substance to emit white light, for example. The 21 LED packages 1 are divided into three groups (seven LED packages 1 per group). The LED packages 1 are successively arranged in line in each group and mounted on the FPC 3.

In FIG. 1A, a LED packages 1A (1A1, . . . , 1A7) denote the LED packages of a first group, a LED packages 1B (1B1, . . . , 1B7) denote the LED packages of a second group, and the LED packages 1C (1C1, . . . , 1C7) denote the LED packages of a third group.

The 21 LED packages 1A, 1B, and 1C are linearly arranged at a constant pitch. The LED packages 1A, 1B, and 1C of the respective groups are connected in series. The LED packages 1A, 1B, and 1C of the three groups are connected in parallel. Naturally, the wiring of the LED packages 1 is not limited thereto, and the LED packages 1A, 1B, and 1C of the respective groups may be alternately arranged, for example.

Figure 2A:
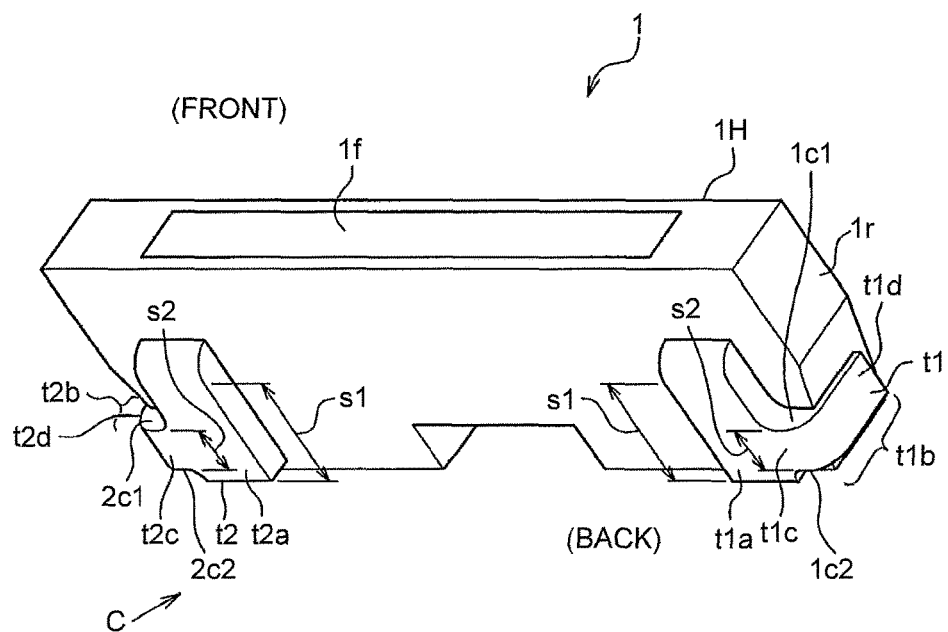
FIG. 2A is a perspective view of an LED package illustrated in FIG. 1A viewed from the lower side in the B-direction.
Figure 2B:
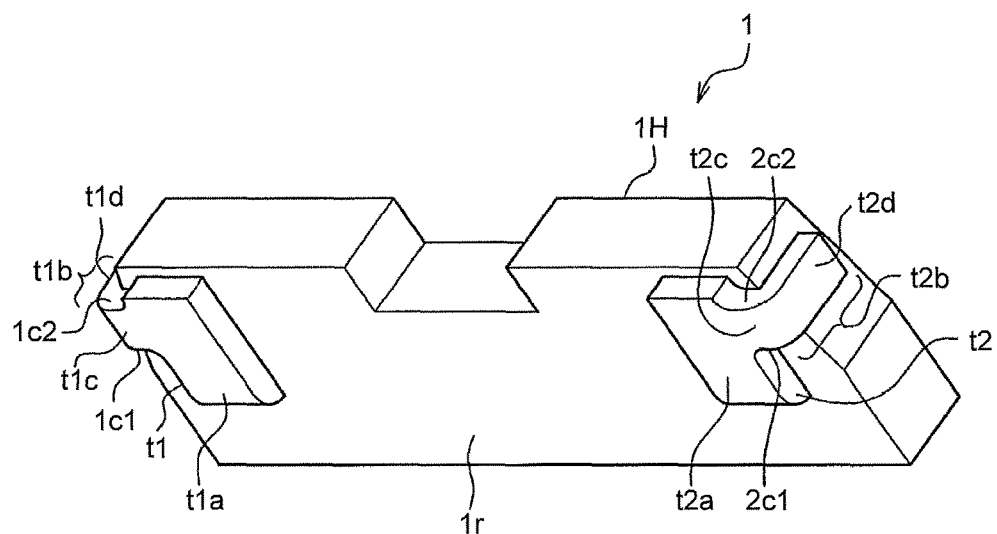
FIG. 2B is a perspective view of the LED package illustrated in FIG. 2A viewed in the C-direction.

FIG. 2A is a perspective view of the LED package illustrated in FIG. 1A viewed from the lower side in the B-direction. FIG. 2B is a perspective view of the LED package illustrated in FIG. 2A viewed in the C-direction. The LED package 1 has a flat rectangular parallelepiped shape and includes electrode terminals t1 and t2 exposed from the lower part thereof. The electrode terminals t1 and t2 serve as lead frames made of a metal, such as copper, and are connected to a pair of an anode and a cathode. In a main body 1H of the LED package 1, an LED chip is mounted on an internal lead frame (not illustrated). The LED chip is surrounded by a sealing resin 1f and a reflector 1r. The sealing resin 1f is arranged on the front side to transmit light and has scattered fluorescent substances. The reflector 1r is provided to the portions around the LED chip other than the portion of the sealing resin 1f arranged on the front side.

The electrode terminals t1 and t2 of the LED package 1 are formed in a symmetrical shape. The first electrode terminal t1 of the LED package 1 has a rectangular main body portion t1a and an L-shaped side surface standing portion t1b. The rectangular main body portion t1a is arranged facing the mounting surface (surface facing the FPC 3) of the LED package 1.

In view of the light emission efficiency (not to block the light from the LED chip), the L-shaped side surface standing portion t1b has a shape bent outward on the back side of the main body 1H. The side surface standing portion t1b has a protruding portion t1c and a standing portion t1d. The protruding portion t1c protrudes outward (toward a first adjacent LED package 1) on the back side of the main body portion t1a. The standing portion t1d extends upward along the side surface of the LED package (housing) 1 from the end of the protruding portion t1c.

Similarly, the second electrode terminal t2 of the LED package 1 has a rectangular main body portion t2a and an L-shaped side surface standing portion t2b. The rectangular main body portion t2a is arranged facing the mounting surface (surface facing the FPC 3) of the LED package 1.

In view of the light emission efficiency (not to block the light from the LED chip), the L-shaped side surface standing portion t2b is bent on the back side of the main body 1H. The side surface standing portion t2b has a protruding portion t2c and a standing portion t2d. The protruding portion t2c protrudes outward (toward a second adjacent LED package 1) on the back side of the main body portion t2a. The standing portion t2d extends upward along the side surface of the LED package (housing) 1 from the end of the protruding portion t2c.

In the electrode terminals t1 and t2 of the LED package 1, the main body portions t1a and t2a and the protruding portions t1c and t2c face the FPC 3. The FPC 3 on which the LED packages 1A, 1B, and 1C are mounted has openings 4k and is covered with a cover lay 4 made of an insulating material and having substantially the same size as that of the FPC 3. The cover lay 4 is made of a heat-resistant and adhesive insulating material.

Figure 3A:
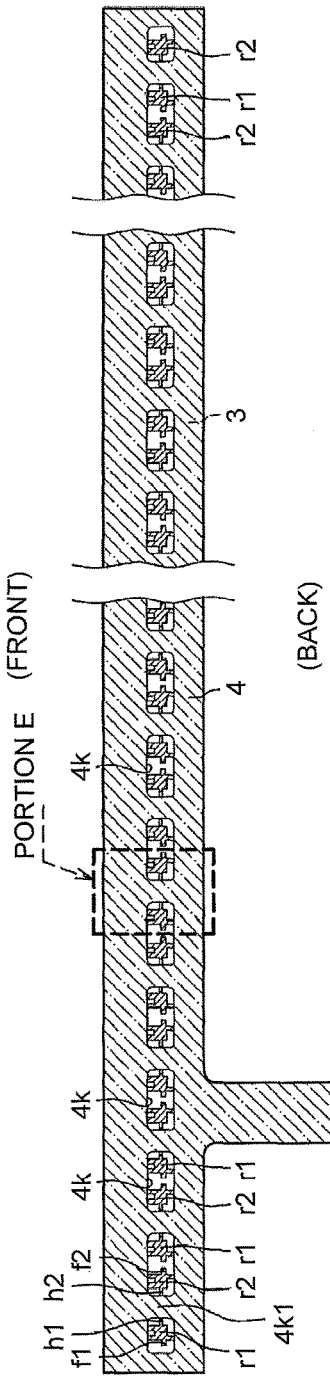
FIG. 3A is a plan view illustrating a state where a cover lay is provided on an FPC.
Figure 3B:
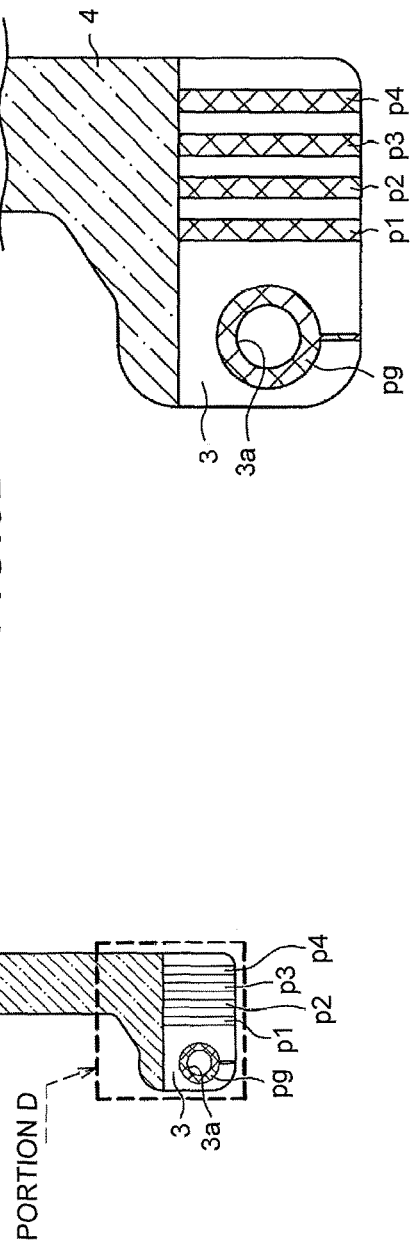
FIG. 3B is an enlarged view of the portion D illustrated in FIG. 1A.

FIG. 3A is a plan view illustrating a state where the cover lay is provided on the FPC. FIG. 3B is an enlarged view of the portion D illustrated in FIG. 3A. The cover lay 4 has the openings 4k from which lands r1 and r2 are exposed. The pair of electrode terminals t1 and t2 of the LED package 1 is inserted into the respective adjacent openings 4k and is connected to the lands r1 and r2, respectively. The opening 4k is formed in the cover lay 4 to collectively expose adjacent lands r2 and r1 out of two pairs of lands r1 and r2 of adjacent LED packages 1. The openings 4k at the left end and the right end serve as openings at the ends and have no LED package 1 arranged on the left side or the right side thereof. As a result, the opening 4k on the left end exposes the land r1 alone, and the opening 4k on the right end exposes the land r2 alone.

FIG. 4A is a plan view of the front surface of the FPC according to the embodiment. FIG. 4B is a plan view of the back surface of the FPC according to the embodiment. The openings 4k of the cover lay 4 are indicated by the alternate long and two short dashes lines in FIG. 4A. The FPC 3 has an LED mounting portion 3A and a wiring drawing portion 3B.

The LED mounting portion 3A is an area on which the LED packages 1 are mounted. The wiring drawing portion 3B is an area in which wiring patterns p1, p2, p3, and p4 illustrated in FIG. 1 are drawn and formed. The front surface of the LED mounting portion 3A of the FPC 3 is provided with the wiring patterns p1, p2, p3, and p4 serving as conductive patterns made of a conductive foil, such as copper, the lands r1 and r2, sub-lands f1 and f2, and drawing portions h1 and h2 (refer to FIG. 4) formed by etching or other processing. The lands r1 and r2, the sub-lands f1 and f2, and the drawing portions h1 and h2 serve as conductive patterns similarly to the wiring patterns p1, p2, p3, and p4.

The LED mounting portion 3A of the FPC 3 is a portion on which the LED packages 1 are mounted in line. The LED packages 1A of the first group, the LED packages 1B of the second group, and the LED packages 1C of the third group are each independently provided and are mounted in series.

The wiring pattern p1 is formed in a manner coupled to the land r1 connected to the electrode terminal t1 of the LED package 1A1 (refer to FIG. 1A) serving as the head of the first group. With this configuration, electric power is supplied from the wiring pattern p1 to the electrode terminal t1 connected to the anode of the LED package 1A1 (refer to FIG. 1A) serving as the head of the first group via the land r1. The electric power is then sequentially supplied from the LED package 1A1 to the other LED packages 1A2, . . . , 1A7 of the first group connected in series.

The wiring pattern p2 is a ground wiring pattern of the LED packages 1A of the first group and is formed in a manner coupled to the land r2 of the LED package 1A7 serving as the last of the first group. With this configuration, the electrode terminal t2 connected to the cathode of the LED package 1A7 serving as the last of the first group is connected to the wiring pattern p2 and thus to the ground via the land r2.

Similarly, the wiring pattern p1 is formed in a manner coupled to the land r1 connected to the electrode terminal t1 of the LED package 1B1 (refer to FIG. 1A) serving as the head of the second group. With this configuration, electric power is supplied from the wiring pattern p1 to the electrode terminal t1 connected to the anode of the LED package 1B1 (refer to FIG. 1A) serving as the head of the second group via the land r1. The electric power is then sequentially supplied from the LED package 1B1 to the other LED packages 1B2, . . . , 1B7 of the second group connected in series.

The wiring pattern p3 is a ground wiring pattern of the LED packages 1B of the second group and is formed in a manner coupled to the land r2 of the LED package 1B7 serving as the last of the second group. With this configuration, the electrode terminal t2 connected to the cathode of the LED package 1B7 serving as the last of the second group is connected to the wiring pattern p3 and thus to the ground via the land r2.

Similarly, the wiring pattern p1 is formed in a manner coupled to the land r1 connected to the electrode terminal t1 of the LED package 1C1 (refer to FIG. 1A) serving as the head of the third group. With this configuration, electric power is supplied from the wiring pattern p1 to the electrode terminal t1 connected to the anode of the LED package 1C1 (refer to FIG. 1A) serving as the head of the third group via the land r1. The electric power is then sequentially supplied from the LED package 1C1 to the other LED packages 1C2, . . . , 1C7 of the third group connected in series.

The wiring pattern p4 is a ground wiring pattern of the LED packages 1C of the third group and is formed in a manner coupled to the land r2 of the LED package 1C7 serving as the last of the third group. With this configuration, the electrode terminal t2 connected to the cathode of the LED package 1C7 serving as the last of the third group is connected to the wiring pattern p4 and thus to the ground via the land r2.

The wiring drawing portion 3B of the FPC 3 is a portion in which the wiring patterns p1, p2, p3, and p4 are drawn. The wiring drawing portion 3B is formed in a nearly orthogonal direction from a portion closer to the end of the LED mounting portion 3A. The wiring drawing portion 3B of the FPC 3 is provided with the wiring patterns p1, p2, p3, and p4 that supply electric power to the LED packages 1A, 1B, and 1C of the first group, the second group, and the third group, respectively. The end of the wiring drawing portion 3B has an attachment hole 3a, and a ground pattern pg connected to the ground is formed around the attachment hole 3a.

A connection of the wiring patterns around the lands r1 and r2 to the pair of electrode terminals t1 and t2 of the LED package 1 will be explained below.

Figure 5:
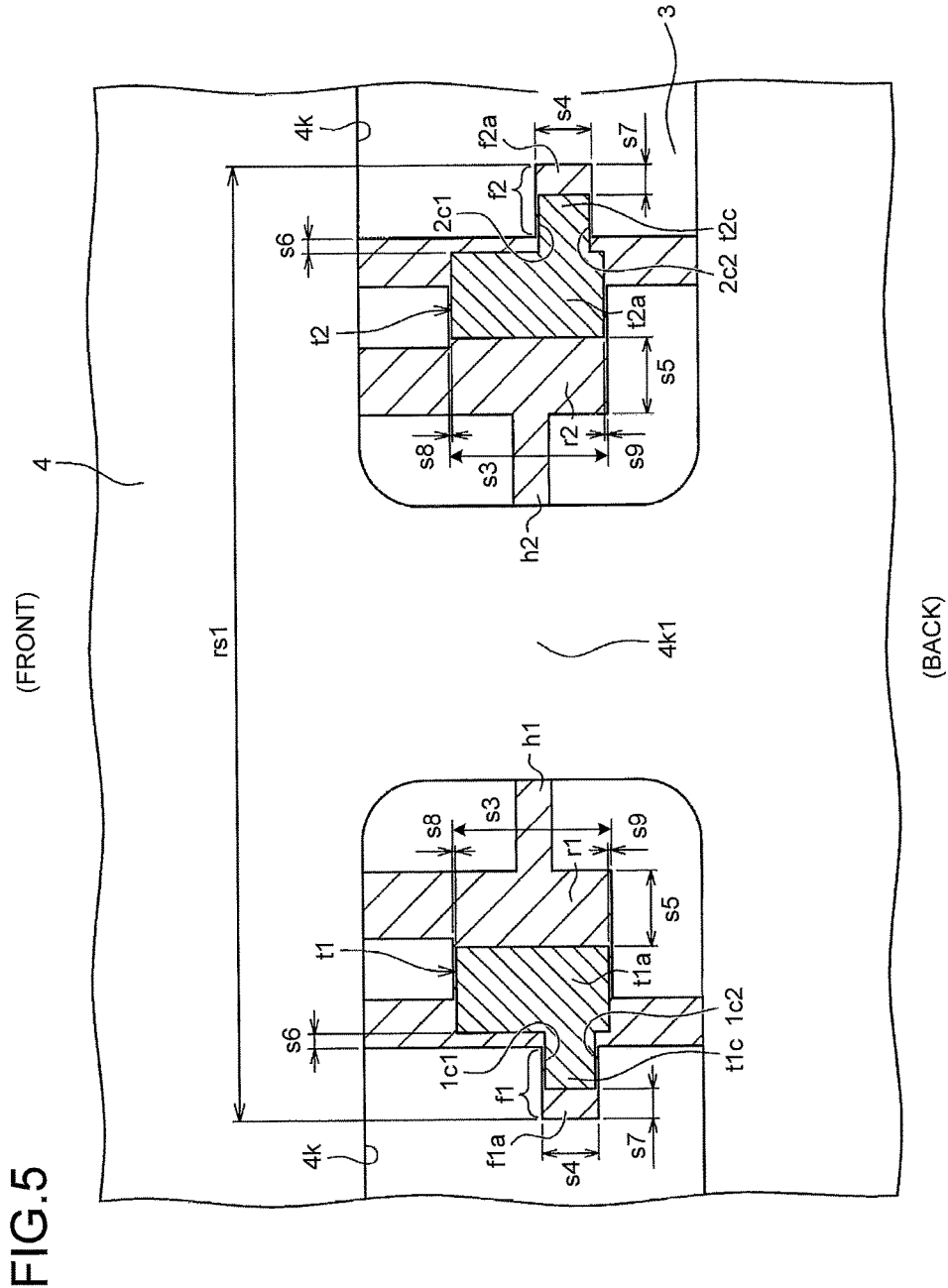
FIG. 5 is an enlarged view of the portion E illustrated in FIG. 3A.

FIG. 5 specifically illustrates a connection (conduction) state of the pair of lands r1 and r2 exposed from the openings 4k of the cover lay 4 to the pair of electrode terminals t1 and t2 of the LED package 1, respectively. FIG. 5 is an enlarged view of the portion E illustrated in FIG. 3A. FIG. 5 also illustrates the main body portions t1a and t2a and the protruding portions t1c and t2c serving as connection (conduction) portions of the electrode terminals t1 and t2 of the LED package 1, respectively. The FPC 3 has as many pairs of lands r1 and r2 as the number of the LED packages 1 formed in a manner coupled to the wiring pattern p1 (refer to FIG. 4A). To the pairs of lands r1 and r2, the pairs of electrode terminals t1 and t2 of the LED packages 1, respectively, are connected.

The lands r1 and r2 have a rectangular shape. A length size s3 of the land r1 is substantially equal to a width size s1 of the rectangular main body portion t1a of the electrode terminal t1 illustrated in FIG. 2A. The length size s3 of the land r1, for example, is set larger than the width size s1 of the main body portion t1a of the electrode terminal t1 by approximately 0.01 mm at each end.

By aligning the width (=size s1) of the rectangular main body portion t1a of the electrode terminal t1 with the length direction (=size s3) of the land r1, the land r1 can be used to position the LED package 1 in mounting of the LED package 1. The sub-land f1 (refer to FIGS. 4A and 5) is formed at the outer side of the land r1 in a manner corresponding to the protruding portion t1c of the electrode terminal t1.

The sub-land f1 is a portion protruding outward from the outer side of the land r1 on the back side of the LED package 1 (refer to FIG. 2A). The sub-land f1 is formed in a rectangular shape having a width size s4 substantially equal to a width size s2 (refer to FIG. 2A) of the protruding portion t1c of the electrode terminal t1. The sub-land f1 has an oblong shape extending to the outside of the protruding portion t1c of the electrode terminal t1. The width size s4 of the sub-land f1, for example, is set larger than the width size s2 (refer to FIG. 2A) of the protruding portion t1c of the electrode terminal t1 by approximately 0.01 mm at each end.

By aligning the width (=size s2) of the protruding portion t1c of the electrode terminal t1 with the width (=size s4) of the sub-land f1, the sub-land f1 may be used to position the electrode terminal t1 of the LED package 1 to the land r1.

The drawing portion h1 having a shape extending inward is formed on the inner side of the land r1. The drawing portion h1 is a conductive pattern to prevent disconnection of the wiring patterns connected to the land r1 (refer to FIG. 4).

Similarly, the length size s3 of the land r2 is substantially equal to the width size s1 of the rectangular main body portion t2a of the electrode terminal t2 illustrated in FIG. 2A. The length size s3 of the land r1, for example, is set larger than the width size s1 of the main body portion t1a of the electrode terminal t1 by approximately 0.01 mm at each end. By aligning the width of the rectangular main body portion t2a of the electrode terminal t2 with the length direction (=size s3) of the land r2, the land r2 can be used to position the LED package 1 in mounting of the LED package 1.

The sub-land f2 (refer to FIGS. 4A and 5) is formed at the outer side of the land r2 in a manner corresponding to the protruding portion t2c of the electrode terminal t2. The sub-land f2 is a portion protruding outward from the outer side of the land r2 on the back side of the LED package 1 (refer to FIG. 2A). The sub-land f2 is formed in a rectangular shape having the width size s4 substantially equal to the width size s2 (refer to FIG. 2A) of the protruding portion t2c. The sub-land f2 has an oblong shape extending to the outside of the protruding portion t2c of the electrode terminal t2.

By aligning the width (=size s2) of the protruding portion t2c of the electrode terminal t2 with the width (=size s4) of the sub-land f2, the sub-land f2 may be used to position the electrode terminal t2 of the LED package 1 to the land r2. The protruding portions t1c and t2c of the electrode terminals t1 and t2, respectively, are formed closer to the outer side than the main body portions t1a and t2a. If the protruding portions t1c and t2c are formed with high accuracy in size with respect to the LED package 1, they are suitably used to position the LED package 1.

The drawing portion h2 having a shape extending inward is formed on the inner side of the land r2. The drawing portion h2 is a conductive pattern to prevent disconnection of the wiring patterns connected to the land r2 (refer to FIG. 4). The pair of the main body portion t1a and the protruding portion t1c of the electrode terminal t1 and the main body portion t2a and the protruding portion t2c of the electrode terminal t2 of the LED package 1 are fixed with solder and electrically connected to the lands r1 and r2, respectively, across an area 4k1 of the cover lay 4 between the openings 4k. Each LED package 1 is thus mounted on the FPC 3.

The planar lighting device S has the following three features. The first feature is: to increase the mounting density of the LED packages 1 in the planar lighting device S, a gap s6 (=approximately 0.05 mm) between the outer sides of the main body portions t1a and t2a of the electrode terminals t1 and t2 of the LED package 1 and the outer sides of the lands r1 and r2 of the FPC 3, respectively, is set smaller than a gap s5 (=approximately 0.25 mm) between the inner sides of the main body portions t1a and t2a of the electrode terminals t1 and t2 of the LED package 1 and the inner sides of the lands r1 and r2 of the FPC 3, respectively.

Specifically, the pair of lands r1 and r2 of the FPC 3 is formed such that the pair of electrode terminals t1 and t2 of the LED package 1 is arranged at an outer area in the pair of lands r1 and r2 of the FPC 3, respectively. In other words, areas f1a and f2a of the sub-lands f1 and f2 are made small, which protrude toward respective adjacent LED packages 1 from the pair of electrode terminals t1 and t2 of the LED package 1, respectively. A size s7 of the areas f1a and f2a protruding outward from the protruding portions t1c and t2c of the electrode terminals t1 and t2, respectively, is approximately 0.10 mm.

With this structure, a second LED package 1 can be arranged adjacently in the longitudinal direction to a first LED package 1 such that the electrode terminal t1 of the adjacent second LED package 1 is arranged as close to the electrode terminal t2 of the first LED package 1 as possible. Furthermore, the electrode terminal t1 of a third adjacent LED package 1 can be arranged as close to the electrode terminal t2 of the second adjacent LED package 1 as possible.

As a result, the gap between the pair of lands r1 and r2 can be made smaller. This configuration can make the pitch between the LED packages 1 narrower and increase the mounting density of the LED packages 1. It is thus possible to increase the luminance of the planar lighting device S.

Figure 6:
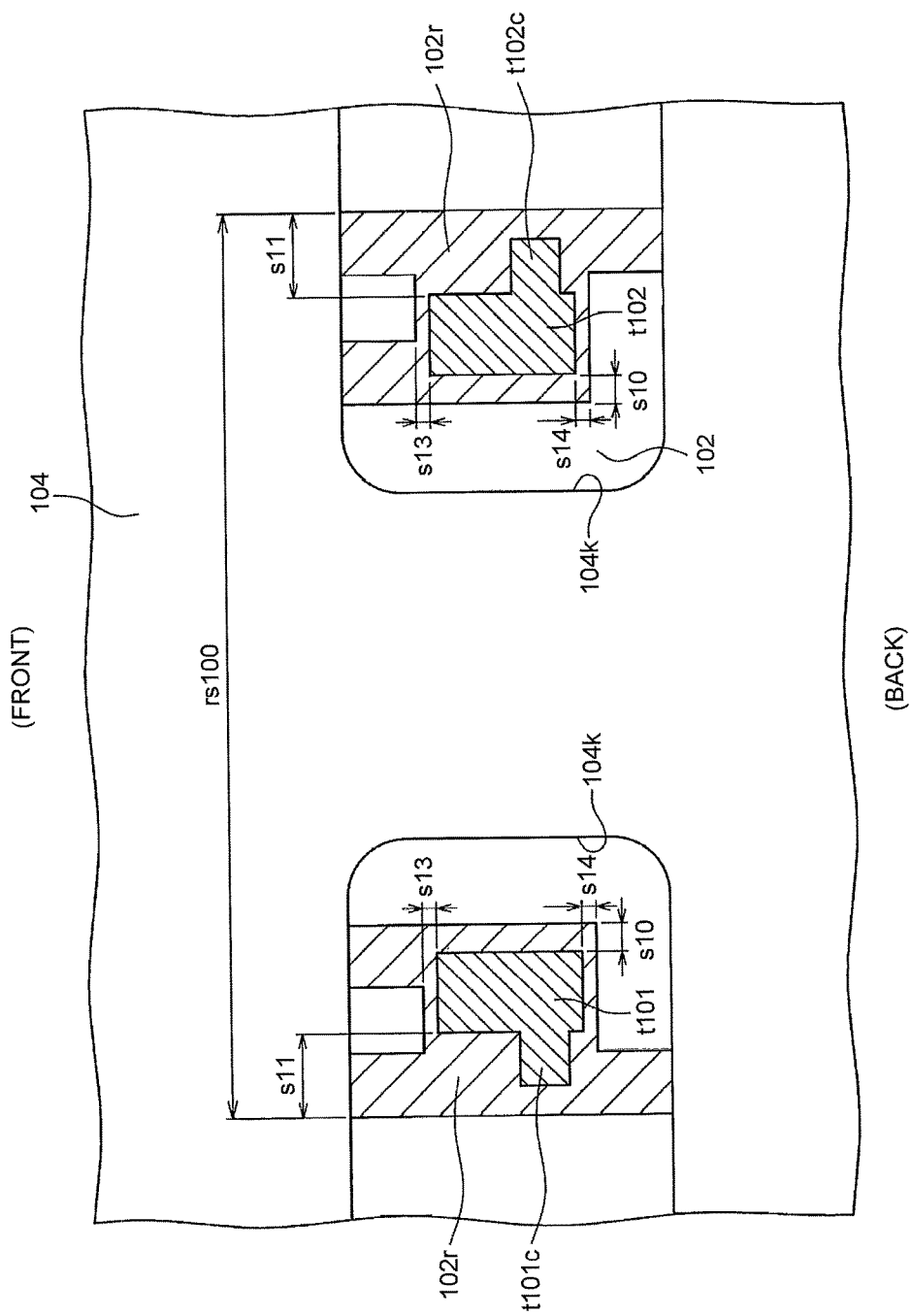
FIG. 6 is a plan view of an arrangement of lands in a circuit pattern of a light source unit of a conventional planar lighting device and electrode terminals in an LED package connected to the lands.

The second feature is as follows. The protruding portions t101c and t102c of the electrode terminals t101 and t102 in the conventional lighting device are arranged in the rectangular lands 101r and 102r, respectively, as illustrated in FIG. 6. By contrast, the protruding portions t1c and t2c of the planar lighting device S are arranged on the sub-lands f1 and f2 of the wiring patterns, respectively, provided in a manner corresponding to the protruding portions t1c and t2c as illustrated in FIG. 5. With the second feature, the LED package 1 can be positioned using the protruding portions t1c and t2c of the pair of electrode terminals t1 and t2 and the sub-lands f1 and f2 of the wiring patterns, respectively. It is thus possible to mount the LED package 1 with higher accuracy.

The sub-lands f1 and f2 are provided in a manner corresponding to the protruding portions t1c and t2c, respectively (such that at least a part of the protruding portions t1c and t2c overlaps with the sub-lands f1 and f2, respectively). With this configuration, pairs of end sides 1c1 and 1c2 and end sides 2c1 and 2c2 on the front and back sides of the protruding portions t1c and t2c, respectively, can be used for positioning (self-alignment) of the LED package 1 in mounting besides the main body portions t1a and t2a of the electrode terminals t1 and t2 of the LED package 1.

As a result, the mounting accuracy of the LED packages 1 is improved. Because the improved mounting accuracy of the LED packages 1 can stabilize and improve the light coupling efficiency between the LED packages 1 and the light guide plate 2 (refer to FIG. 1A), it is thus possible to increase the luminance of the planar lighting device S. The present configuration can be provided by arranging the electrode terminals t1 and t2 of the LED package 1 at an outer area in the lands r1 and r2 of the FPC 3, respectively.

The third feature is as follows. The conventional lighting device has no drawing portion h1 or h2 (refer to FIGS. 5 and 4A) disclosed in the present embodiment on the inner sides of the lands 101r and 102r, respectively, as illustrated in FIG. 6. By contrast, the planar lighting device S has the drawing portions h1 and h2 extending inward (toward the lands r2 and r1 opposite thereto) from the inner sides of the lands r1 and r2, respectively. As described above, the drawing portions h1 and h2 are auxiliary wiring that prevents disconnection (refer to FIG. 4A).

The backlight has a structure (design) assembled by causing the LED packages 1 to abut on (come into contact with) the side end surface 2s of the light guide plate 2 as indicated by the arrow a1 defined by an outline in FIG. 1A. The strength against peeling of the LED packages 1 from the FPC 3, that is, the bonding strength of the LED packages 1 to the FPC 3 is highly important.

In the abutting process, the wiring (conductive patterns) on the FPC 3 on the light guide plate 2 side is subjected to external force in a manner lifted from (a base material 3b of) the FPC 3. By contrast, the wiring (conductive patterns) on the side opposite to the light guide plate 2 side is subjected to external force in a manner pressed against the FPC 3. As a result, the wiring on the light guide plate 2 side is more likely to be peeled off from the FPC 3 than the wiring on the side opposite to the light guide plate 2 side. To address this, the planar lighting device S has a larger number of drawn wires drawn in the light guiding direction (optical axis direction) from the lands 101r and 102r on the light guide plate 2 side than on the side opposite to the light guide plate 2 side.

As described above, the LED packages 1 serving as point light sources and the LED packages 1 serving as point light sources of other adjacent groups are independently connected to the ground via the wiring patterns p2, p3 and p4. In other words, the LED packages 1A of the first group, the LED packages 1B of the second group, and the LED packages 1C of the third group are independently connected as a circuit from the wiring pattern p1 via the wiring patterns p2, p3 and p4, respectively.

The clearance (clearance in the longitudinal direction) between the pads (lands r1 and r2) formed outside the electrode terminals t1 and t2 of the LED package 1 and the main body portions t1a and t2a of the electrode terminals t1 and t2, respectively, is reduced from conventional 0.29 mm (=s11 in FIG. 6) to approximately 0.05 mm (=s6 in FIG. 5).

With this structure, to mount the LED package 1 on the lands r1 and r2, the LED package 1 can be positioned in the longitudinal direction by aligning the longitudinal direction of the main body portions t1a and t2a of the LED package 1 with the longitudinal direction of the lands r1 and r2, respectively.

In addition, the clearance between the protruding portions t1c and t2c of the electrode terminals t1 and t2 of the LED package 1 and the lands r1 and r2 formed outside thereof, respectively, is reduced from conventional 0.2 mm to approximately 0.10 mm (=s7 in FIG. 5). As a result, the areas f1a and f2a of the lands r1 and r2 (sub-lands f1 and f2) can be made smaller, which protrude outward from the main body portions t1a and t2a of the electrode terminals t1 and t2, respectively.

With this structure, to mount the LED package 1 on the lands r1 and r2, the LED package 1 can be tentatively positioned in the longitudinal direction by aligning the longitudinal direction of the protruding portions t1c and t2c of the electrode terminals t1 and t2 of the LED package 1 with the longitudinal direction of the sub-lands f1 and f2, respectively.

In order to further improve the mounting accuracy of the LEDs, the clearance between the lands r1 and r2 and the electrode terminals t1 and t2 in the LED light emitting direction (short direction of the LED package 1), respectively, is reduced from conventional 0.05 mm (=s13 and s14 in FIG. 6) to approximately 0.01 mm (=s8 and s9 in FIG. 5). With this structure, to mount the LED package 1 on the lands r1 and r2, the LED package 1 can be positioned in the short direction by aligning the short direction of the main body portions t1a and t2a of the LED package 1 with the short direction of the lands r1 and r2, respectively.

The width size s4 of the sub-lands f1 and f2 is set larger than the width size s2 of the protruding portion t1c of the electrode terminal t1 by approximately equal to or smaller than 0.01 mm at each end. With this structure, the LED package 1 can be accurately positioned in the short direction by aligning the short direction of the protruding portions t1c and t2c of the LED package 1 with the width of the sub-lands f1 and f2, respectively.

This configuration enables the electrode terminals t1 and t2 of the LED package 1 to be accurately mounted on the lands r1 and r2 and the sub-lands f1 and f2, respectively. It is thus possible to improve the mounting accuracy.

With this configuration, the pad width (distance between the lands r1 and r2) of one LED is reduced from 3.34 mm (=rs100 in FIG. 6) to approximately 3.14 mm (=rs1 in FIG. 5). This structure can make the pitch between the LED packages 1 narrower and improve the mounting accuracy of the LEDs.

The improved mounting accuracy of the LEDs can suppress light leakage when LED light from the LED packages 1 enters into the light guide plate 2.

As described above, the distance between the lands r1 and r2 in one LED is reduced from conventional 3.34 mm to approximately 3.14 mm (=rs1 in FIG. 5). This structure can make the pitch between the LED packages 1 narrower and enable the LED packages 1 to be mounted with high density. It is thus possible to increase the luminance of the planar lighting device S.

As described above, the clearance (s8 and s9 in FIG. 5) (clearance in the short direction of the LED package 1) between the lands r1 and r2 formed inside the terminals of the LED package 1 and the electrode terminals t1 and t2, respectively, is reduced to 0.01 mm. This structure, however, may possibly reduce the mounting strength of the LEDs. To address this, the clearance between the lands r1 and r2 formed closer to the inner side than the two electrode terminals t1 and t2 and the electrode terminals t1 and t2, respectively, is increased from 0.1 mm (=s10 in FIG. 6) to 0.25 mm (=s5 in FIG. 5). This structure can increase the area on which solder is placed, thereby securing a predetermined mounting strength.

The LED packages 1A of the first group, the LED packages 1B of the second group, and the LED packages 1C of the third group are independently connected as a circuit from the wiring pattern p1 via the wiring patterns p2, p3 and p4, respectively. When an LED package 1 of any one of the first to the third groups fails, lighting can be continuously performed by the LED packages 1 of the other groups that do not fail. The reliability of the planar lighting device S when failing is thus increased.

It is thus possible to provide the planar lighting device S to which the light sources can be mounted with high density and high accuracy.

The number and the shape of the drawing portions h1 and h2 according to the embodiment above are not intended to limit the present disclosure.

In the embodiment above, the LED packages 1 (1A, 1B, and 1C) of the adjacent three sets (three groups) can be independently controlled to drive, for example. Alternatively, wiring patterns of two sets (two groups) or four or more sets (four or more groups) may be independently formed in a manner similar to that of the embodiment above.

The clearance (clearance in the short direction of the LED package 1) between the lands r1 and r2 and the electrode terminals 1t and 2t in the LED light emitting direction, respectively, is set to approximately 0.01 mm (=s8 and s9 in FIG. 5), for example. Alternatively, the clearance may be set to equal to or smaller than 0.03 mm. The clearance, however, is preferably set to approximately equal to or smaller than 0.01 mm as described in the embodiment above because the LED package 1 can be more accurately positioned in the short direction.

In the embodiment above, the width size s4 of the sub-land f1 is set larger than the width size s2 of the protruding portion t1c of the electrode terminal t1 by approximately 0.01 mm at each end. Alternatively, the width size s4 may be set larger by equal to or smaller than 0.03 mm. The width size s4 of the sub-land f1, however, is preferably set larger than the width size s2 of the protruding portion t1c of the electrode terminal t1 by approximately equal to or smaller than 0.01 mm at each end as described in the embodiment above because the LED package 1 can be more accurately positioned in the short direction.

In the embodiment above, the clearance (clearance in the longitudinal direction of the LED package 1) between the lands r1 and r2 formed outside the electrode terminals t1 and t2 provided to the outer part of the LED package 1 and the main body portions t1a and t2a of the electrode terminals t1 and t2, respectively, is reduced to approximately 0.05 mm (=s6 in FIG. 5). Alternatively, the clearance may be set to equal to or smaller than 0.1 mm. The clearance, however, is preferably set to approximately 0.05 mm as described in the embodiment above because the LED package 1 can be more accurately positioned with respect to the lands r1 and r2 in the longitudinal direction.

In the embodiment above, the clearance between the outer sides of the protruding portions t1c and t2c of the electrode terminals t1 and t2 of the LED package 1 and the sub-lands f1 and f2, respectively, is set to 0.1 mm (=s7 in FIG. 5). Alternatively, the clearance may be set to equal to or smaller than 0.15 mm. The clearance, however, is preferably set to 0.1 mm (=s7 in FIG. 5) as described in the embodiment above because the LED package 1 can be more accurately positioned with respect to the lands r1 and r2 and the sub-lands f1 and f2 in the longitudinal direction of the LED package 1.

In the embodiment above, the main body portions t1a and t2a of the electrode terminals t1 and t2 of the LED package 1, respectively, have a rectangular shape, for example. The main body portions t1a and t2a may have any desired shape other than the rectangle as long as they enable the electrode terminals t1 and t2 to be reliably connected to and accurately positioned on the lands r1 and r2, respectively. The shape may be an ellipse or a trapezoid, for example.

While various configurations have been described in the disclosure, one of the configurations may be selected, or several configurations may be appropriately selected and combined.

According to the disclosure, the light sources may be arranged such that, in the longitudinal direction thereof, the gap between the outer side of the pair of electrode terminals and the outer side of the corresponding pair of lands is smaller than the gap between the inner side of the pair of electrode terminals and the inner side of the corresponding pair of lands. This structure enables the light sources to be mounted with high density. It is thus possible to increase the luminance of the planar lighting device.

According to the disclosure, the pair of electrode terminals of each of the light sources may include the pair of respective main body portions and the pair of respective protruding portions protruding outward from the respective outer ends of the pair of main body portions, the pair of main body portions and the pair of protruding portions serving as the electrical connection portion. The pair of protruding portions may be connected to the pair of respective sub-lands each formed protruding outward from the corresponding outer side of the pair of lands. With this configuration, the light sources can be positioned when being mounted also by aligning the pair of protruding portions of the pair of electrode terminals with the pair of sub-lands. It is thus possible to improve the mounting accuracy.

According to the disclosure, in the longitudinal direction of the light sources, the distance between outer sides of the pair of main body portions may be substantially equal to the distance between outer sides of the pair of lands. With this configuration, the light sources can be positioned in the longitudinal direction when being mounted by aligning the outer sides of the pair of main body portions with the outer sides of the pair of lands.

According to the disclosure, the light sources may be positioned in the longitudinal direction using both outer sides of the pair of main body portions in the longitudinal direction of the light sources and both outer sides of the pair of lands in the longitudinal direction of the light sources. It is thus possible to improve the mounting accuracy of the light sources in the longitudinal direction.

According to the disclosure, the size of the pair of main body portions of the pair of electrode terminals in the short direction of the light sources may be substantially equal to the size of the pair of lands in the short direction of the light sources. With this configuration, the light sources can be positioned in the short direction by aligning the short direction of the pair of main body portions of the pair of electrode terminals with the short direction of the pair of lands.

According to the disclosure, the light sources may be positioned in the short direction using the portion of the pair of main body portions of the pair of electrode terminals in the short direction of the light sources and the portion of the pair of lands in the short direction of the light sources. It is thus possible to improve the mounting accuracy of the light sources in the short direction.

According to the disclosure, the size of the pair of protruding portions of the pair of electrode terminals in the short direction of the light sources may be substantially equal to the size of the pair of sub-lands in the short direction of the light sources. With this configuration, the light sources can be positioned in the short direction by aligning the short direction of the pair of protruding portions of the pair of electrode terminals with the short direction of the pair of sub-lands.

According to the disclosure, the light sources may be positioned in the short direction using the portion of the pair of protruding portions of the pair of electrode terminals in the short direction of the light sources and the portion of the pair of sub-lands in the short direction of the light sources. It is thus possible to improve the mounting accuracy of the light sources in the short direction.

According to the disclosure, the wiring patterns serving as the drawing portions may prevent a failure from occurring when the wiring around the pair of lands is disconnected.

According to the disclosure, the size between outer sides of the pair of sub-lands in the longitudinal direction of the light sources may be substantially equal to the size between outer sides of the pair of protruding portions of the pair of electrode terminals in the longitudinal direction of the light sources. With this configuration, the light sources can be mounted with high accuracy in the longitudinal direction. Furthermore, the light sources can be mounted with high density.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A planar lighting device comprising:
    a light guide plate;
    a plurality of light sources arranged in line along a longitudinal direction of a side end surface of the light guide plate, each of light sources including a pair of electrode terminals facing each other; and
    a mounting substrate on which the light sources are mounted, the mounting substrate including a conductive pattern including a plurality of pairs of lands facing each other to which the respective pairs of electrode terminals of the light sources are connected, wherein
    the light sources are mounted such that, in a longitudinal direction of the light sources, a gap between a side of one of the pairs of electrode terminals facing the other electrode terminal and a side of corresponding one of the pairs of lands facing the other land is larger than a gap between the side of the pair of electrode terminals opposite to the facing side and the side of the corresponding pair of lands opposite to the facing side.

2. The planar lighting device according to claim 1, wherein
    the pair of electrode terminals of each of the light sources includes a pair of respective main body portions located between the facing side of the electrode terminal and the opposite side of the electrode terminal and a pair of respective protruding portions protruding outward from respective opposite side of the electrode terminal, the pair of main body portions and the pair of protruding portions serving as an electrical connection portion, and
    the pair of lands includes a pair of respective sub-lands each protruding outward from the corresponding opposite sides of the pair of lands and to which the pair of respective protruding portions are connected.

3. The planar lighting device according to claim 2, wherein, in the longitudinal direction of the light sources, a distance between opposite sides of the pair of the electrode terminals is substantially equal to a distance between opposite sides of the pair of lands.

4. The planar lighting device according to claim 3, wherein the light sources are positioned in the longitudinal direction using both opposite sides of the pair of the electrode terminals in the longitudinal direction of the light sources and both opposite sides of the pair of lands in the longitudinal direction of the light sources.

5. The planar lighting device according to claim 2, wherein a size of the pair of the electrode terminals of the pair of electrode terminals in a short direction of the light sources is substantially equal to a size of the pair of lands in the short direction of the light sources.

6. The planar lighting device according to claim 5, wherein the light sources are positioned in the short direction using a portion of the pair of main body portions of the pair of electrode terminals in the short direction of the light sources and a portion of the pair of lands in the short direction of the light sources.

7. The planar lighting device according to claim 2, wherein a size of the pair of protruding portions of the pair of electrode terminals in the short direction of the light sources is substantially equal to a size of the pair of sub-lands in the short direction of the light sources.

8. The planar lighting device according to claim 7, wherein the light sources are positioned in the short direction using a portion of the pair of protruding portions of the pair of electrode terminals in the short direction of the light sources and a portion of the pair of sub-lands in the short direction of the light sources.

9. The planar lighting device according to claim 2, wherein a size between each side of the pair of sub-lands far from the pair of lands in the longitudinal direction of the light sources is substantially equal to a size between each side of the pair of protruding portions of the pair of electrode terminals far from the pair of the electrode terminals in the longitudinal direction of the light sources.

10. The planar lighting device according to claim 9, wherein the pair of lands is provided with respective wiring patterns serving as drawing portions formed in a shape extending inward.

11. The planar lighting device according to claim 1, wherein the pair of lands is provided with respective wiring patterns serving as drawing portions formed in a shape extending inward.

* * * * *